United States Patent Office 2,975,221
Patented Mar. 14, 1961

2,975,221

POLYMERIZATION INHIBITOR

Marvin L. Owens, Jr., Texas City, Tex., assignor to Monsanto Chemical Company, St. Louis, Mo., a corporation of Delaware No Drawing. Filed Apr. 17, 1959, Ser. No. 807,032

2 Claims. (Cl. 260—666.5)

The present invention relates to the stabilization of vinyl aromatic hydrocarbons against polymerization and, more particularly, to such stabilization at elevated temperatures.

It is well known that vinyl aromatic compounds such as styrene, its homologs and analogs, tend to polymerize upon standing at ordinary temperatures and particularly when subjected to elevated temperatures. Concentration and purification of these monomers is ordinarily effected by distillation or fractionation and in these operations considerable difficulty has been experienced due to polymer formation. The polymer is deposited upon the surfaces of the equipment and accumulates to the extent that the distillation must be interrupted at frequent intervals to clean out the equipment. In addition to the fact that this results in substantial losses of the monomer, the delays in production caused by the necessity of removing the polymer formed may also be an important cost factor. Also, since the monomers are subjected to autopolymerization, there is some risk in storing and/or shipping them due to the exothermic nature of the polymerization reaction. Further, in the manufacture of polymers from these monomers, premature polymerization even to a very slight degree may render the monomer unfit for use since it may seriously affect the properties of the final polymeric product. For these and other reasons, it is essential to prevent premature polymerization and in common practice this is done by adding an inhibiting agent to the monomer.

It is an object of the present invention to provide a novel polymerization inhibitor for vinyl aromatic compounds.

A further object of the invention is to provide a polymerization inhibitor for vinyl aromatic hydrocarbons which is effective at elevated temperatures such as those that are encountered in concentration and purification of said compounds by distillation and/or fractionation.

Another object of the invention is to provide inhibited monomeric vinyl aromatic compounds.

Other objects and advantages will become apparent from the following description of the invention.

According to the invention, the polymerization of vinyl aromatic compounds is effectively inhibited by the incorporation therein of a minor amount of tetracyanoethylene. The following example illustrates the invention but is not to be construed as limiting it in any manner whatsoever. Where parts are mentioned, they are parts by weight.

*Example 1*

The polymerization of styrene containing 0.5% tetracyanoethylene and styrene containing no inhibitor was studied by means of dilatometric experiments. The dilatometer employed was of the stopcock type with a bulb of 25-ml. capacity and a 70-cm. capillary stem of 2.5-mm. bore. The open capillary top was plugged with a small glass bead to eliminate any evaporation of the monomer. In order to insure that it was free of any gas, the styrene employed was distilled under argon and maintained under an argon atmosphere prior to polymerization. The styrene charge was drawn into the dilatometer by suction through a tube extending below the bottom of the degassed styrene. The dilatometer was then placed in a mineral oil bath so that the bulb and 5 cm. of the capillary stem were submerged below the oil level. The oil bath was heated to raise the temperature of the styrene to 120±0.2° C. Approximately 15 minutes were required for the solution to reach thermal equilibrium after immersion of the dilatometer in the thermostatically controlled bath.

Initially upon heating, the volume of the styrene in the capillary tube rises to a given level. Thereafter, as polymerization begins and continues, the level of liquid in the capillary tube provides a direct measure of the mount of polymerization which is occurring. The following tabulation of data taken on the two samples shows the change in volume as a function of time and demonstrates that the styrene containing tetracyanoethylene polymerizes only about one-fifth as fast as does the uninhibited styrene.

| Uninhibited Styrene | | | | Styrene Inhibited with Tetracyanoethylene | | | |
|---|---|---|---|---|---|---|---|
| Time | Dilatometer Height (mm.) | Δh (mm.) | Δt (hr.) | Time | Dilatometer Height (mm.) | Δh (mm.) | Δt (hr.) |
| 11:00 | 437 | | | 2:15 | 419 | | |
| 11:15 | 425 | 12 | 0.25 | 2:45 | 418 | 1 | 0.5 |
| 12:00 | 365 | 72 | 1.0 | 3:45 | 411 | 8 | 1.5 |
| 1:00 | 283 | 154 | 2.0 | 4:00 | 402 | 17 | 1.75 |
| 2:00 | 198 | 239 | 3.0 | 4:15 | 390 | 29 | 2.0 |

The amount of the inhibitor to be used will of course vary according to the particular conditions under which it is used. For storage at low temperatures as little as five parts by weight of tetracyanoethylene per million parts by weight of monomer may be effective. At the higher temperatures at which these inhibitors are highly effective such as, for example, 120° C., larger amounts are required. Generally, proportions of tetracyanoethylene within the range from 0.001% to about 5% by weight are employed.

The inhibitor of the invention is effective with compounds containing ethylenic unsaturation in a side chain. It is particularly effective with such vinyl aromatic compounds as styrene, α-methylstyrene, ring-methylated styrenes and ring-chlorinated styrenes, divinylbenzene, ethylvinylbenzene, vinylnaphthalene, and the like.

Monomers containing very low concentrations of the inhibitor, in the range of 5 p.p.m. for example, can be polymerized by adding an excess of the catalyst. When larger quantities are used, it is desirable to remove the inhibitor prior to polymerization. This can be done by extraction with a suitable agent such as, for example, 1 N caustic.

What is claimed is:
1. The method of preventing the polymerization of styrene which comprises incorporating therein an amount of tetracyanoethylene sufficient to inhibit polymerization.
2. A composition comprising styrene containing an amount of tetracyanoethylene sufficient to inhibit polymerization of said styrene.

References Cited in the file of this patent

UNITED STATES PATENTS 2,660,594    Calingaert _____ Nov. 24, 1953